US010167032B2

(12) United States Patent
Wolfmueller et al.

(10) Patent No.: US 10,167,032 B2
(45) Date of Patent: Jan. 1, 2019

(54) ARRANGEMENT FOR SECURING VEHICLE TOOLS

(71) Applicant: Bayerische Motoren Werke Aktiengesellschaft, Munich (DE)

(72) Inventors: Hans Wolfmueller, Erding (DE); Rainer Wamser, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 15/239,941

(22) Filed: Aug. 18, 2016

(65) Prior Publication Data

US 2016/0355228 A1 Dec. 8, 2016

Related U.S. Application Data

(63) Continuation of application No. PCT/EP2015/051639, filed on Jan. 28, 2015.

(30) Foreign Application Priority Data

Feb. 20, 2014 (DE) ........................ 10 2014 203 111

(51) Int. Cl.
*B25H 3/02* (2006.01)
*B62J 9/02* (2006.01)
(Continued)

(52) U.S. Cl.
CPC ................ *B62J 9/02* (2013.01); *B25H 3/022* (2013.01); *B60R 11/06* (2013.01); *B62J 9/006* (2013.01); *B62J 2099/0093* (2013.01)

(58) Field of Classification Search
CPC ..... B62J 9/02; B62J 2099/0093; B25H 3/022; B25H 3/00; B25H 3/02; B25H 3/021;
(Continued)

(56) References Cited

U.S. PATENT DOCUMENTS 2,529,372 A * 11/1950 Burns ...................... B25H 3/04
211/70.6
3,878,939 A * 4/1975 Wilcox .................. B25H 3/021
190/18 A
(Continued)

FOREIGN PATENT DOCUMENTS

CN 1376610 A 10/2002
CN 201006696 Y 1/2008
(Continued)

OTHER PUBLICATIONS

Chinese-language Office Action issued in counterpart Chinese Application No. 201580002847.6 dated Nov. 6, 2017 with English translation (Thirteen (13) pages).
(Continued)

*Primary Examiner* — Joseph M Rocca
*Assistant Examiner* — Michael R Stabley
(74) *Attorney, Agent, or Firm* — Crowell & Moring LLP

(57) ABSTRACT

An arrangement is composed of an elastic to highly elastic tool carrier which has a number of cavities that protrude from the tool carrier and are formed preferably integrally therewith. The cavities have pocket-like receiving spaces which are configured to hold vehicle tools. The cavities are configured and arranged in pairs such that in each case one end-side tool portion can be introduced into and removed from, in each case, one of the pocket-like receptacles of the cavities. During the introduction and removal of the tools, the cavities can be moved or elastically displaced, on account of their elasticity, from a storage position (starting position) into an insertion or removal position (displaced position), such that the respectively other end of the tool slips out of or can be removed from the pocket-like receptacle.

14 Claims, 2 Drawing Sheets

(51) Int. Cl.
 *B60R 11/06* (2006.01)
 *B62J 9/00* (2006.01)
 *B62J 99/00* (2009.01)

(58) Field of Classification Search
 CPC ........... B25H 3/06; B60R 11/06; A45C 13/02; A45C 13/26
 See application file for complete search history.

(56) References Cited

U.S. PATENT DOCUMENTS

| | | | |
|---|---|---|---|
| 4,226,347 A * | 10/1980 | Rice | B62J 9/02 206/376 |
| 4,416,483 A | 11/1983 | Koch | |
| 4,938,355 A * | 7/1990 | Rocco | B44D 3/121 206/372 |
| 5,511,662 A * | 4/1996 | Amoroso | B25H 3/06 206/373 |
| 5,518,158 A * | 5/1996 | Matlack | B60R 9/00 224/402 |
| 5,533,783 A * | 7/1996 | Harms | B62J 1/12 180/219 |
| 5,638,915 A * | 6/1997 | Hardy | B25H 3/00 182/129 |
| 6,032,796 A * | 3/2000 | Hopper | B25G 1/005 206/377 |
| 6,109,437 A * | 8/2000 | Chao | B25H 3/06 206/303 |
| 6,405,618 B1 * | 6/2002 | Sorensen | B25G 1/085 81/177.4 |
| 6,415,924 B1 * | 7/2002 | Lee | B25H 3/023 206/373 |
| 6,454,092 B1 * | 9/2002 | Lee | B25H 3/003 206/378 |
| 6,834,767 B1 * | 12/2004 | Lin | B25H 3/00 206/349 |
| 6,851,499 B2 * | 2/2005 | Yagisawa | B62K 19/46 180/219 |
| 6,968,961 B1 * | 11/2005 | Peete | A45D 44/04 211/126.1 |
| 7,014,240 B2 * | 3/2006 | Nagashii | B62H 5/00 296/1.05 |
| 7,032,908 B2 * | 4/2006 | Melvin | B25H 5/00 280/32.6 |
| 7,055,689 B2 * | 6/2006 | Chen | B25H 3/04 206/349 |
| D524,541 S * | 7/2006 | Cauley | D3/294 |
| 7,195,119 B2 * | 3/2007 | Lungo | E06C 7/14 182/129 |
| 7,434,700 B2 * | 10/2008 | Kao | A47F 7/0028 206/372 |
| 7,530,459 B2 * | 5/2009 | Yeh | B25H 3/02 206/372 |
| 7,708,097 B1 | 5/2010 | Tharaldson et al. | |
| 8,037,835 B2 * | 10/2011 | Miura | B62J 1/12 114/55.57 |
| 8,336,708 B2 * | 12/2012 | Potterfield | B25H 3/02 206/373 |
| 8,893,885 B2 * | 11/2014 | Hutchens | G09F 23/00 206/373 |
| 2005/0092797 A1 | 5/2005 | Takahashi et al. | |
| 2006/0201835 A1 * | 9/2006 | Shih | B25H 3/003 206/373 |
| 2009/0152313 A1 | 6/2009 | Gandy et al. | |

FOREIGN PATENT DOCUMENTS

| | | |
|---|---|---|
| CN | 202557424 U | 11/2012 |
| CN | 203078439 U | 7/2013 |
| DE | 1 788 800 | 5/1959 |
| DE | 31 01 161 A1 | 8/1982 |
| DE | 101 59 719 A1 | 3/2003 |
| EP | 0 838 373 A2 | 4/1998 |
| EP | 1 243 500 A2 | 9/2002 |
| GB | 155626 | 12/1920 |
| WO | WO 2012/015826 A2 | 2/2012 |

OTHER PUBLICATIONS

Chinese-language Office Action issued in counterpart Chinese Application No. 201580002847.6 dated Jun. 11, 2018 with English translation (thirteen (13) pages).

International Search Report (PCT/ISA/210) issued in PCT Application No. PCT/EP2015/051639 dated May 18, 2015, with English translation (six (6) pages).

German Search Report issued in counterpart German Application No. 10 2014 203 111.7 dated Oct. 17, 2014, with partial English translation (eleven (11) pages).

* cited by examiner

ARRANGEMENT FOR SECURING VEHICLE TOOLS

CROSS REFERENCE TO RELATED APPLICATIONS

This application is a continuation of PCT International Application No. PCT/EP2015/051639, filed Jan. 28, 2015, which claims priority under 35 U.S.C. § 119 from German Patent Application No. 10 2014 203 111.7, filed Feb. 20, 2014, the entire disclosures of which are herein expressly incorporated by reference.

BACKGROUND AND SUMMARY OF THE INVENTION

The invention relates to an arrangement for receiving vehicle tools, and a seat for a powered two-wheel vehicle, such as, for example, a motorcycle seat having a receptacle of this type.

Various solutions exist in the prior art for stowing repair tools or vehicle tools reliably and accessibly in a vehicle. Here, particular problems occur in the case of motorcycles, two-wheelers and motor scooters in comparison with spacious passenger cars and trucks.

DE 3101161 A1, for example, discloses a tool or instrument pouch which is attached to the inner side of the trunk lid of a motor vehicle. The arrangement is configured such a that part of the pouch which receives the tools or instruments is articulated so it can be folded downward on the trunk lid until in a horizontal position when the trunk lid is pivoted upward, whereas the other part of the pouch is formed by the trunk lid itself or is fastened removably to the latter with the first-mentioned part as an entirety. An embodiment of this type cannot be transferred appropriately to motorcycles or motor scooters, however.

DE 10159719 A1 discloses an arrangement of vehicle tools and/or a car jack in a vehicle. The arrangement includes a receiving container, in which vehicle tools can be introduced. It is possible for the receiving container to be attached using suitable fasteners in the interior of the motor vehicle. Furthermore, it is possible for the receiving container to be fastened in the region of a side wall trim of the inner side of the motor vehicle. Comparable solutions are also known in the field of two-wheel motorcycles, in which a receiving container for vehicle tools is accommodated in a storage compartment.

EP 0 838 373 A2 discloses a further embodiment of a receiving container for vehicle tools. Here, it is possible for the receiving container to be screwed fixedly on the floor of the motor vehicle. Embodiments of this type cannot be transferred to a motorcycle or a scooter. Furthermore, containers and receptacle pouches of this type have various disadvantages.

It proves disadvantageous in an arrangement of this type that removal of a vehicle tool is uncomfortable for the user and requires that covers or holders sometimes have to be removed first. When the tool is later placed back into the pouch, it can rarely be repacked in the as-delivered state, with the result that it then no longer fits into the receptacle.

Holding apparatuses in storage compartments are provided to this end as alternative solutions, into which holding apparatuses individual tools are fastened by use of rubber rings, clamping rubbers or clips. Clamping rubbers are cumbersome, however, and a plurality of tools which are held by a common clamping rubber frequently have to be removed at the same time. Furthermore, the tools can rattle against the storage component walls during driving, which leads to disruptive noise during driving. Plastic clips fatigue and sometimes break after ageing phenomena, with the result that the tools can no longer be fastened at all.

It is the object of the present invention to overcome the abovementioned disadvantages and to provide an apparatus of the generic type described at the outset, by way of which vehicle tools are held reliably in a motorcycle, motor scooter or the like, are accessible comfortably and, moreover, absorb the high forces which occur as a result of the driving dynamics.

This and other objects are achieved by way of an arrangement for a motor vehicle seat, as well as a seat for a powered two-wheel vehicle, for example a motorcycle, in accordance with embodiments of the invention.

The basic concept of the present invention consists in that an arrangement is formed from a tool carrier which is made to be elastic to highly elastic and has a number of cavities which project from the tool carrier and are preferably configured in one piece with the latter with pocket-like receiving spaces configured for holding vehicle tools. The cavities are arranged and configured in pairs in such a way that in each case one preferably end-side tool section can be inserted into or removed from in each case one of the pocket-like receptacles of the cavities. During insertion and removal of the tools, the cavities can be moved or displaced elastically from a storage position (starting position) into a plug-in or removal position (displaced position) on account of their elasticity, with the result that the respective other end of the vehicle tool slides out or can be removed from the pocket-like receptacle.

According to the invention, an arrangement for a powered two-wheel vehicle seat for receiving vehicle tools and the like is therefore proposed, the arrangement forming a tool carrier which is made from at least one elastically deformable material and has a plurality of cavities with, in each case, one plug-in opening for inserting a section of a vehicle tool into a receiving space of the cavity. It is possible for the cavities to be moved from a storage position (starting position) into a plug-in or removal position (displaced position) on account of their elasticity.

In one particularly preferred embodiment of the invention, the cavities are configured in one piece and from one material with the tool carrier.

In a further preferred embodiment of the invention, the material of the tool carrier and, therefore, of the cavities is formed from a molded foam, preferably from a soft elastic integral foam or a highly elastic or visco-elastic polyurethane foam. Other elastic foam materials are likewise conceivable as long as they can be moved elastically to and fro from a storage position (starting position) into a plug-in or removal position (displaced position) for the tools on account of their elasticity.

It is particularly advantageous if in each case one cavity pair comprising two cavities which are spaced apart from one another is provided for one or more of the vehicle tools, the pairs being arranged with respect to one another in such a way that their plug-in openings are oriented with respect to one another at an angle between 0° and 90°. In other words, this means that the spacing of the cavities which are arranged in pairs and the position of the plug-in openings are adapted to the tool length and tool shape. It is particularly preferred if the ends of the tools are supported against one or more inner wall sections in the cavities. In this way, driving dynamic forces can be absorbed in the corresponding directions.

In one particularly preferred embodiment of the invention, the cavities project as cup-like elevations from the surface of the tool carrier on the insertion and removal side of the arrangement, preferably in the same spatial direction.

The projecting cavities can thus be configured, for example, as parallelepiped-shaped, cylindrical or partially cylindrical elevations on the insertion and removal side of the arrangement and, in each case, form a circumferential section and a bottom section. The bottom section of the cavity forms a holding section for the tools on the insertion and removal side of the arrangement, in order to hold said tools in a direction perpendicularly with respect to the driving direction during driving dynamic accelerations and, for example, during driving through dips. Movements in and counter to the driving direction and lateral movements are absorbed by way of circumferential sections which are formed by side walls.

One or more of the plug-in openings along the respective circumferential section of the cavity is/are advantageously configured in the circumferential direction in a region of more than 20%, preferably in a region of between 40 and 60% of the entire circumference. Thus, for example, in the case of a parallelepiped-shaped cavity which has four side walls which form the circumference, the plug-in opening can be configured along two adjacent side walls (which corresponds to a circumferential section of approximately 50%). The parallelepiped-shaped cavity which is spaced apart from this and forms a cavity pair can form a plug-in opening only along one side wall, which corresponds to a circumferential region of approximately 25%. In this way, the tools can be removed laterally from the pocket-like receptacles in a simpler manner.

In a further preferred embodiment of the invention, one or more vehicle tools are inserted into the arrangement, the inserted vehicle tools being plugged with at least one, preferably both end-side tool sections into, in each case, one pocket-like receptacle through the corresponding plug-in opening of the respective cavity and being fixed by the elastic material which surrounds the tool section.

A further aspect of the present invention relates to a seat for a motorcycle, powered two-wheel vehicle or the like, the seat being provided with a seat shell opposite the seat surface on its underside, in which seat shell an arrangement as described above for receiving vehicle tools is located. Here, the arrangement is arranged in the seat shell in such a way that the fitting and removal side for the tools is arranged on the underside, that is to say the side which faces away from the seat surface. In the case of a foldable seat, the seat can thus be folded open out of its normally closed position, with the result that the tools are accessible.

In an advantageous refinement of the seat, in each case one pair of two cavities which are spaced apart from one another is provided for the vehicle tools, the plug-in openings of which cavities are oriented at an angle between 0° and 90° with respect to one another, and the orientation of the pairs of cavities is configured in the seat longitudinal direction of the seat. In other words, the plug-in openings are provided on side wall sections of the cavity pairs which face one another, or on side wall sections which are offset by an angle of approximately 90°.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
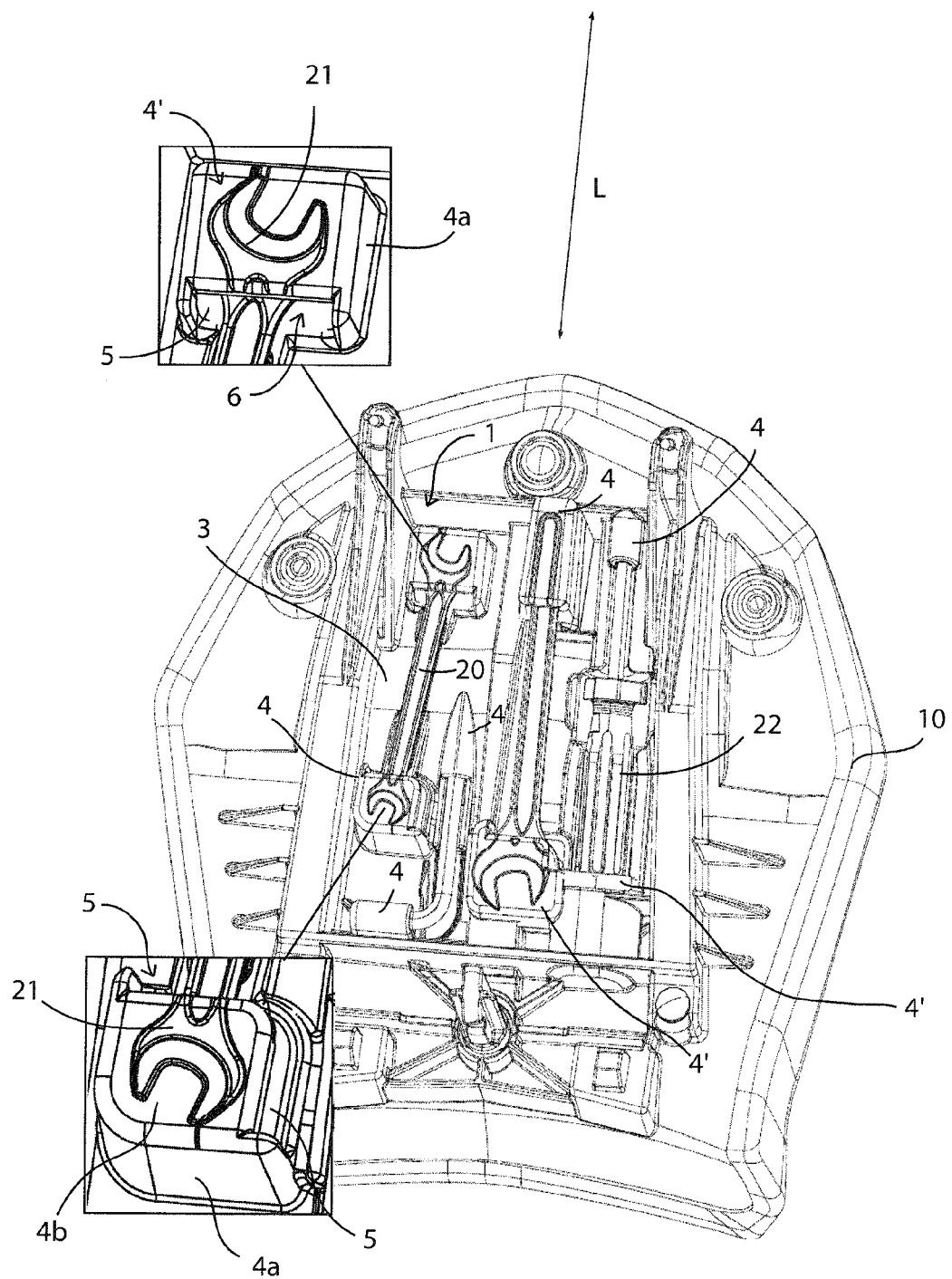
FIG. 1 is a bottom view of a motorcycle seat with one exemplary embodiment of an arrangement according to the invention for receiving a plurality of vehicle tools, along with two enlarged details.

FIG. 1 shows a bottom view of a motorcycle seat 10 with an arrangement 1 for receiving a plurality of vehicle tools 20.

Figure 2A:
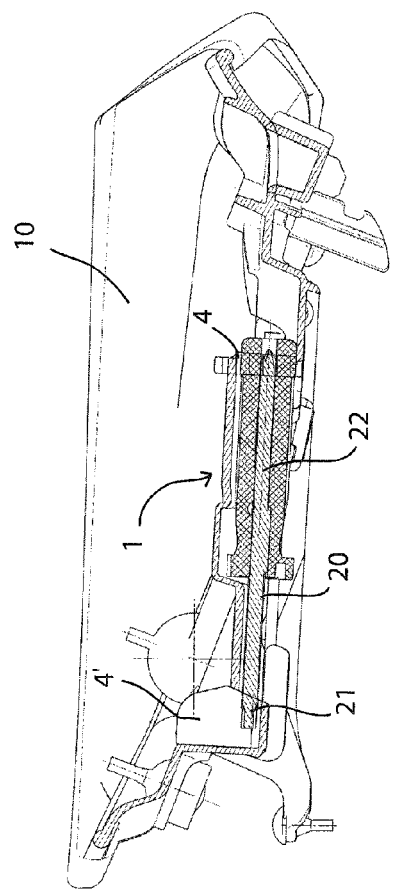
FIGS. 2A and 2B are sectioned side views through the seat according to FIG. 1.
Figure 2B:
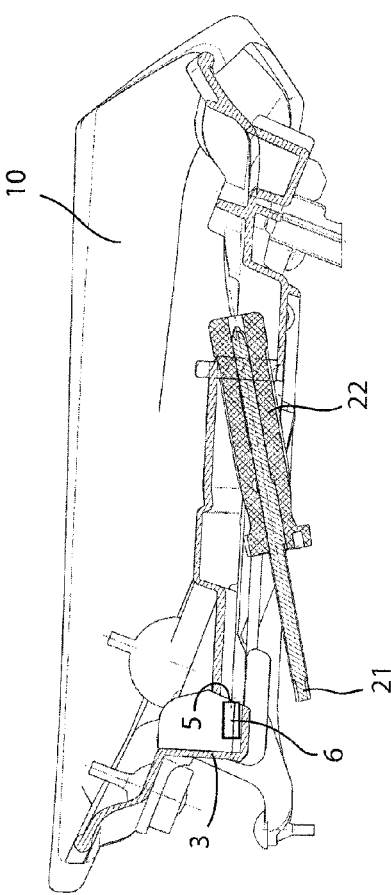

The arrangement 1 includes a tool carrier 3 which is made from at least one elastically deformable material and has a plurality of cavities 4, 4' with, in each case, one plug-in opening 5 for inserting a section 21 of a vehicle tool 20 into the receiving space 6 of the cavity 4, 4'. As shown in FIGS. 2A and 2B, the cavities 4, 4' can be moved from a storage position (upper view of FIG. 2A) into a plug-in or removal position (lower view of FIG. 2B) on account of their elasticity.

FIGS. 2A and 2B show side views of a screwdriver 20 which is mounted between two cavities, the right-hand cavity 4 being deformed by means of pressure on the screwdriver 20 via its handle 22 in such a way that the tool section 21 which lies opposite the handle 22 can be moved out of the cavity 4'.

Here, the cavities 4, 4' are formed in one piece with the tool carrier 3 and are formed from a highly elastic molded foam. It can be seen further in FIG. 1 that the four exemplary vehicle tools 20 are held by, in each case, one cavity pair comprising two cavities 4, 4' which are spaced apart from one another. The pairs are arranged with respect to one another in such a way that their plug-in openings 5 are oriented at an angle from 0° to 90° with respect to one another. The Allen key, for example, is introduced with its ends into plug-in openings 5 of cavities 4; 4', the plug-in openings being oriented at an angle of 90° with respect to one another on account of the angled portion of the Allen key (L-key).

It can be seen further that the cavities 4, 4' project as cup-like elevations out of the surface on the insertion and removal side of the arrangement 1, to be precise as elevations which form either a parallelepiped-shaped, cylindrical or partially cylindrical enveloping shape. The elevations have a circumferential section 4a and a bottom section 4b.

The plug-in opening 5 in the lower cavity 4 of the spanner wrench 20 shown on the far left in FIG. 1 is formed into the cavity along its upper and right-hand circumferential section 4a, and thus approximately in a region of 50% of the entire circumferential section of the overall circumference of said cavity 4 which is formed by way of the four side walls.

It can be seen further that each pair of two cavities 4, 4' which are spaced apart from one another are arranged such that they are oriented in the seat longitudinal direction L or along an imaginary seat longitudinal axis. The vehicle tools 20 which are inserted are plugged with their two end-side tool sections 21 into, in each case, one receiving space 6 of a plug-in opening 5 of a cavity 4, 4' of a cavity pair and are fixed by the elastic material of the cavity 4, 4' which surrounds the tool section 21. In this way, the orientation of the tools is with their longitudinal extent preferably approximately parallel to the longitudinal axis L of the seat.

The implementation of the invention is not restricted to the preferred exemplary embodiments specified above. Rather, a number of variants are contemplated which use the illustrated solution even in embodiments of fundamentally different type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for a motor vehicle seat for receiving one or more vehicle tools, the arrangement comprising:
a tool carrier which is made from at least one elastically deformable material and has a plurality of cavities with, in each case, one plug-in opening for inserting a section of a vehicle tool into a receiving space of the cavity, the tool carrier being at least one of integral with a seat shell of the seat and configured to conform to an underside surface of the seat shell, wherein the cavities are movable from a storage position into a plug-in or removal position on account of their elasticity, an outer enveloping shape of the cavities is of an either parallelepiped-shaped, cylindrical or partially cylindrical configuration and has a circumferential section and a bottom section, and in each case, one cavity pair comprising two cavities which are spaced apart from one another is provided for one or more of the vehicle tools, the pairs being arranged with respect to one another such that their plug-in openings are oriented at an angle between 0° and 90° with respect to one another.

2. The arrangement according to claim 1, wherein the cavities are formed in one piece with the tool carrier.

3. The arrangement according to claim 2, wherein the material of the tool carriers and the cavities are formed from a molded foam, preferably from a soft integral foam.

4. The arrangement according to claim 1, wherein the material of the tool carrier and the cavities are formed from a molded foam, preferably from a soft integral foam.

5. The arrangement according to claim 4, wherein the molded foam is a soft integral foam, a highly elastic foam, or a visco-elastic polyurethane foam.

6. The arrangement according to claim 4, wherein, in each case, one cavity pair comprising two cavities which are spaced apart from one another is provided for one or more of the vehicle tools, the pairs being arranged with respect to one another such that their plug-in openings are oriented at an angle between 0° and 90° with respect to one another.

7. The arrangement according to claim 1, wherein the cavities project as cup-shaped elevations on an insertion and removal side of the arrangement.

8. The arrangement according to claim 1, further comprising:
one or more vehicle tools, wherein the one or more vehicle tools are plugged with at least one end-side tool section into one receiving space of a plug-in opening of a cavity and are fixed by the elastic material of the cavity which surrounds the tool section.

9. An arrangement for a motor vehicle seat for receiving one or more vehicle tools, the arrangement comprising:
a tool carrier which is made from at least one elastically deformable material and has a plurality of cavities with, in each case, one plug-in opening for inserting a section of a vehicle tool into a receiving space of the cavity,
wherein
the cavities are movable from a storage position into a plug-in or removal position on account of their elasticity,
the cavities project as cup-shaped elevations on an insertion and removal side of the arrangement, and
an outer enveloping shape of the cavities which project out of the tool carrier is of an either parallelepiped-shaped, cylindrical or partially cylindrical configuration and has a circumferential section and a bottom section.

10. The arrangement according to claim 9, wherein one or more of the plug-in openings along the respective circumferential section of the cavity is configured in said circumferential direction in a region of more than 20% of the entire circumference.

11. The arrangement according to claim 10, wherein the region is between 40% and 60% of the entire circumference.

12. An arrangement for a motor vehicle seat for receiving one or more vehicle tools, the arrangement comprising:
a tool carrier which is made from at least one elastically deformable material and has a plurality of cavities with, in each case, one plug-in opening for inserting a section of a vehicle tool into a receiving space of the cavity, and
one or more vehicle tools,
wherein
the cavities are movable from a storage position into a plug-in or removal position on account of their elasticity,
the one or more vehicle tools are plugged with at least one end-side tool section into one receiving space of a plug-in opening of a cavity and are fixed by the elastic material of the cavity which surrounds the tool section, and
the one or more vehicle tools are plugged with both end-side tool sections into, in each case, one receiving space of a plug-in opening.

13. A seat for a powered two-wheel vehicle, comprising:
a seat shell; and
a vehicle tool receiving arrangement on the seat shell, the vehicle tool receiving arrangement comprising:
forming a tool carrier which is made from at least one elastically deformable material and has a plurality of cavities with, in each case, one plug-in opening for inserting a section of a vehicle tool into a receiving space of the cavity, wherein
the cavities are movable from a storage position into a plug-in or removal position on account of their elasticity
an outer enveloping shape of the cavities is of an either parallelepiped-shaped, cylindrical or partially cylindrical configuration and has a circumferential section and a bottom section,
one pair of two cavities which are spaced apart from one another is provided, in each case, for one or more of a plurality of vehicle tools, and
the plug-in openings of the pair of cavities are oriented at an angle between 0° and 90° with respect of one another.

14. The seat according to claim 13, wherein
an orientation of the one pair of two cavities is configured in a longitudinal direction of the seat.

* * * * *